United States Patent [19]

Woodgate et al.

[11] Patent Number: 4,899,784
[45] Date of Patent: Feb. 13, 1990

[54] MOTOR VEHICLE FUEL TANK

[75] Inventors: Michael J. Woodgate, Horndon on the Hill; Ronald P. Pardy, Tiptree, both of United Kingdom

[73] Assignee: Ford Motor Company, Dearborn, Mich.

[21] Appl. No.: 842,619

[22] Filed: Mar. 21, 1986

[30] Foreign Application Priority Data

May 8, 1985 [GB] United Kingdom ............... 8511612

[51] Int. Cl.⁴ .............................................. E03B 11/00
[52] U.S. Cl. .................................. 137/574; 137/576; 123/514
[58] Field of Search ................ 123/514, 516; 137/574, 137/576, 565

[56] References Cited

U.S. PATENT DOCUMENTS 3,020,950 2/1962 Schraivogel ........................ 137/574
3,049,171 8/1962 Neuerburg .......................... 137/574
4,397,333 8/1983 Liba et al. .......................... 137/574
4,453,564 6/1984 Bergesio ............................. 137/574
4,503,885 3/1985 Hall .................................... 137/574

FOREIGN PATENT DOCUMENTS 2401728 12/1983 Fed. Rep. of Germany .
2069431 8/1986 United Kingdom .

Primary Examiner—A. Michael Chambers
Attorney, Agent, or Firm—Jerome R. Drouillard; Roger L. May

[57] ABSTRACT

A fuel tank contains a swirl pot into which a fuel return pipe from the engine is directed and which induces fuel flow from the tank into the pot so that the fuel level in the pot is kept high. Fuel flow into the pot is induced by directing a flow of fuel from the return pipe over a ramp past an opening into the tank so as to create a low pressure area at the opening.

7 Claims, 3 Drawing Sheets

MOTOR VEHICLE FUEL TANK

BACKGROUND OF THE INVENTION

Field of the Invention

This invention relates to a motor vehicle fuel tank, and to a swirl pot for use in such a tank to prevent the fuel pump from being starved of fuel under certain circumstances when the fuel level in the tank is low.

DISCLOSURE INFORMATION

When a motor vehicle is on a slope, or when it travels around a corner, or when it accelerates or decelerates, there is a tendency for the fuel in the tank to slosh to one side or other of the tank and therefore at least in some conditions the fuel will tend to flow away from the fuel pump intake, resulting in fuel starvation. If such starvation occurs the pump will suck air rather than fuel and this will result initially in the engine running unevenly, and in extreme cases, in the engine stopping.

In fuel injected engines, the volume of fuel pumped out of the tank and fed to the engine is greater than the volume consumed by the engine. The excess fuel overflows in the injection pump and injectors and serves to cool the pump and injectors. The excess fuel is then returned to the tank through a fuel return line. In a swirl pot, the energy possessed by this returning fuel is used to maintain a head of fuel around the fuel pump intake to prevent fuel starvation from occurring.

The term "swirl pot" used in this specification means a container fitted or to be fitted at the bottom of a fuel tank, from which fuel is drawn by the fuel pump intake and to which returning fuel from the engine is directed in such a manner as to induce a fuel flow from the tank into the pot, to maintain a head of fuel in the pot.

A swirl pot is known from German Offenlegungsschrift No. 24 01 728. This pot uses a fuel return pipe which terminates, outside the pot, in a jet which is directed into the pot through a funnel to draw fuel into the pot. This pot is complicated to manufacture and difficult to assemble in a tank because of the different angles of the feed pipes. A similar arrangement is disclosed in U.K. patent application No. 2,069,431A.

Fuel tank designers have employed various systems to assure an adequate supply of liquid fuel in the locus about a fuel pickup. Examples of baffles employed for this purpose are found in U.S. Pat. Nos. 3,020,950 and 4,453,564. These devices have only limited practicability because they are passive. That is, the devices are unable to draw fuel into the baffle section. Another type of device is disclosed in U.S. Pat. No. 3,049,171 in which a fuel return pipe fills a swirl pot. This device too is unable to draw fuel from the surrounding tank volume into the swirl pot.

It is an object of the present invention to provide a swirl pot which produces a suction through an opening communicating with the main tank volume so as to draw fuel into the pot.

U.S. Pat. Nos. 4,397,333 and 4,503,885 disclose a fuel tank having a collector situated at the bottom of the tank which includes a jet aspirator employed to enhance flow of fuel into the reservoir. These systems are bulky and difficult to install because the fuel line extending from the reservoir will not permit the reservoir assembly to be inserted into the tank through a small opening.

According to the present invention there is provided a swirl pot having an opening adjacent its base and means within the pot for directing a flow of liquid past the opening in a direction so as to produce a suction through the opening.

Because the suction producing flow of liquid operates within the pot, the pot construction can be more compact than has heretofore been possible, and the pot is therefore easier to manufacture and easier to assemble inside the tank.

It is an object of the present invention to provide a swirl pot having a fuel return pipe extending in a generally straight line within the fuel tank, which will allow the fuel pipe and swirl pot assembly to be inserted into the tank through an opening of modest size as compared to the openings required for other swirl pots.

SUMMARY OF THE DISCLOSURE

A motor vehicle fuel tank comprises a main volume and a swirl pot having a base and outer wall and being positioned near the bottom of the tank and having an opening adjacent the swirl pot base. The pot includes means for directing a flow of liquid past the opening adjacent the base in such a direction so as to produce a suction through the opening which will draw fuel into the pot. The means for directing the flow of liquid in the pot preferably comprises a ramp located in the pot. The ramp preferably extends toward the base of the pot and ends just above the base. The opening in the wall of the pot which allows admission of the fuel into the pot lies between the ramp and the base. The ramp preferably extends around an arcuate path of approximately 35° about the inner periphery of the pot and is bounded on one side by a wall of the pot and on the other side by internal wall in the pot. The internal wall extends around an arcuate path of about 60°.

The pot and ramp may be advantageously formed as a single integral plastic molding. In a preferred embodiment, fuel pump intake is arranged to draw fuel from within the pot and the fuel return line is arranged to deliver fuel to the ramp in such a direction so as to produce suction through the wall opening. The fuel return line preferably includes a restriction so that fuel is delivered into the pot as a jet.

If desired, an electric fuel pump may be located within the swirl pot. The pot may be positioned behind a weir, which will enhance its ability to marshall fuel about the fuel pump intake.

As previously mentioned, because the fuel return pipe extends in a generally straight line within the fuel tank, the swirl pot and other components associated with the pot may be inserted into the tank through an opening of modest size as compared to openings required for insertion of other swirl pot apparatus.

DESCRIPTION OF THE PREFERRED EMBODIMENT

Figure 1:
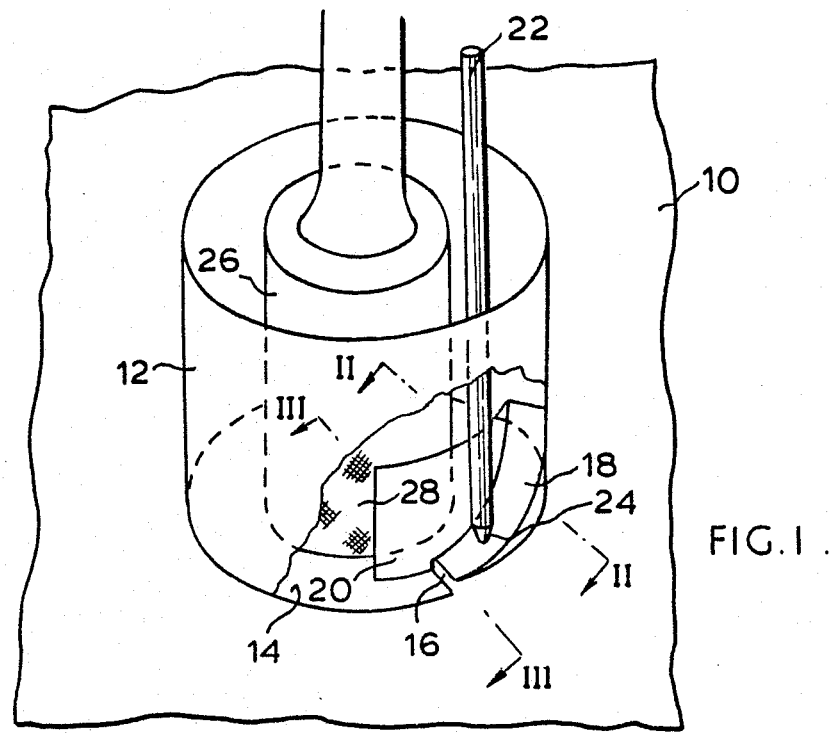
FIG. 1 is a perspective view, partially broken away, of a swirl pot in accordance with the invention.
Figure 2:
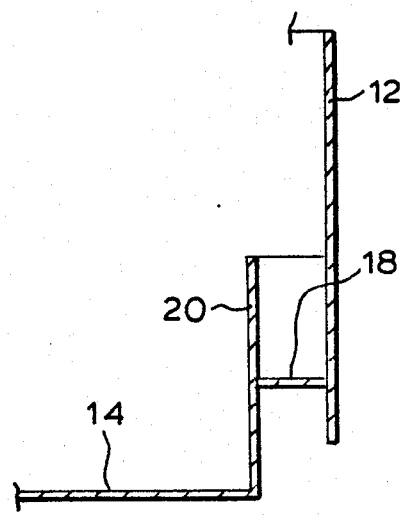
FIG. 2 is a section through the swirl pot along the line II—II of FIG. 1.
Figure 3:
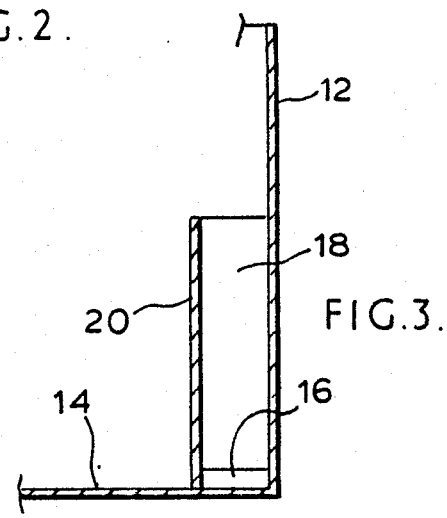
FIG. 3 is a section through the swirl pot along the line III—III of FIG. 1.
Figure 4:
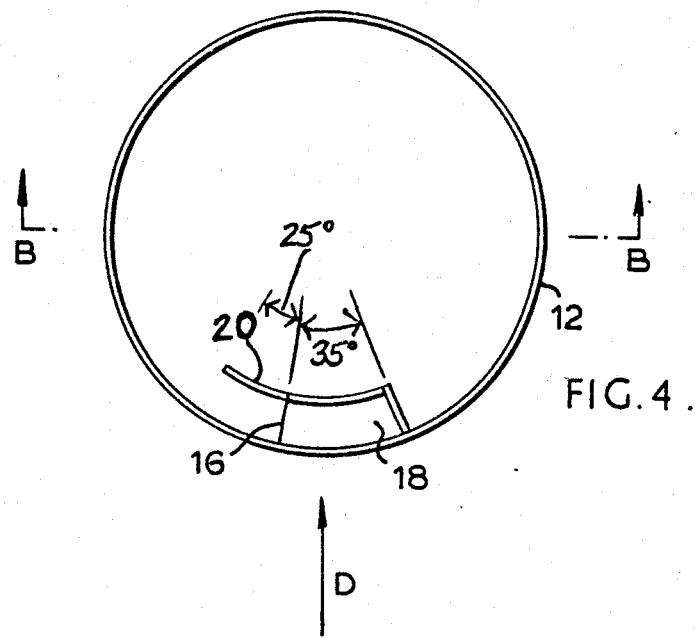
FIG. 4 is a plan view of the swirl pot.
Figure 5:
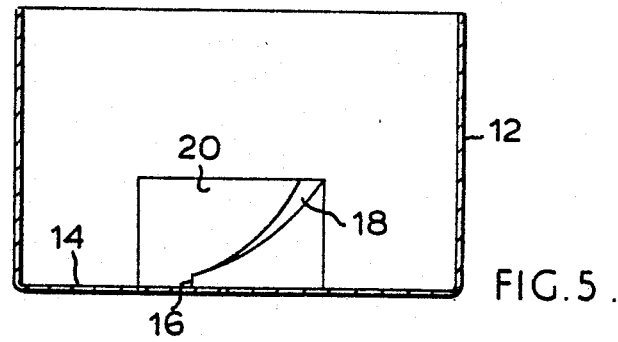
FIG. 5 is an elevation of the swirl pot.
Figure 6:
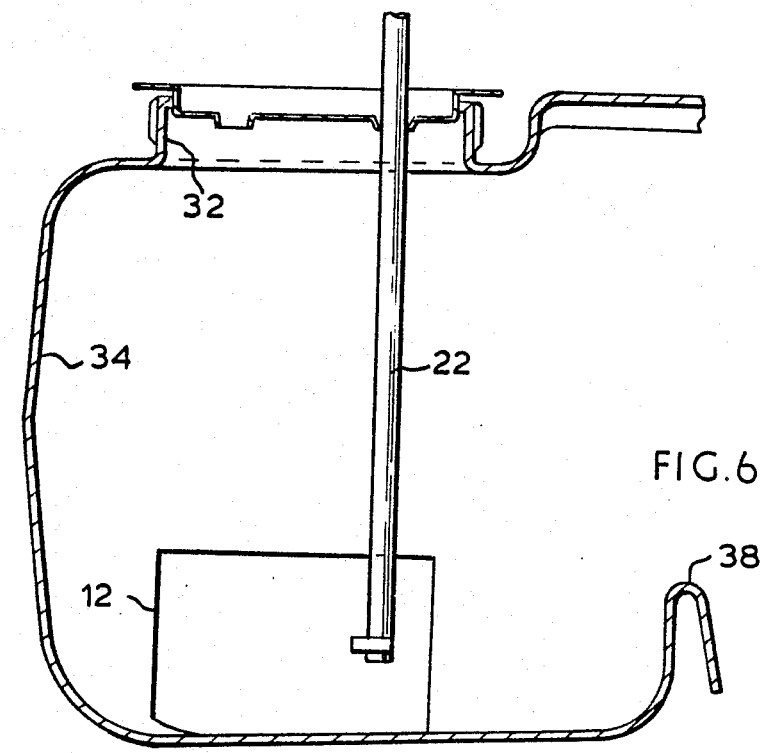
FIG. 6 is a section through a fuel tank showing the swirl pot in position.

FIG. 1 shows the floor of a fuel tank 10 with a swirl pot 12 standing on it. The pot shown has an open top and a closed base 14. However, the top could be closed (provided it is vented) and the bottom could be formed by the floor of the tank 10 if the walls of the pot were sealed to the floor. Proximate the base 14 there is an opening 16 which extends through the wall of the pot and allows fuel to flow between the pot and the remainder of the tank. Opening 16 is formed at the bottom of ramp 18 inside the pot and the ramp is bounded on one side by the outside wall of the pot and on the other side by a boundary wall 20. The ramp preferably extends around an arc of 35° and the boundary wall 20 preferably extends around an arc of 60°. These extensions are shown in FIG. 4. As best shown in FIGS. 1 and 6, fuel return pipe 22 enters pot 12 from above and terminates just above ramp 18. A nozzle 24 or a similar jet forming restriction in the pipe is fitted on pipe 22.

Within pot 12 is a fuel pump 26 which has a mesh-shrouded intake region 28.

In operation, when the fuel tank is full, fuel will fill the pot through its open top and pump intake 28 (FIG. 1) will always be submerged. Once the fuel level in the tank falls below the level of the top of the pot, fuel continues to be withdrawn from the pot through the pump 26 and fed to the engine. Unconsumed fuel is returned to the pot through pipe 22. When this returned fuel impinges on ramp 18, it is directed down the ramp and sweeps off the end of the ramp leaving a low pressure area below. Fuel is drawn into this low pressure area through opening 16 and thus as engine operation continues, fuel continues to be drawn from the tank into the pot and the pot overflows. Under steady operating conditions, the action of the swirl pot ensures that it is always kept full to overflowing with fuel. Thus the pump intake remains submerged even when the general level of fuel in the tank is low. Fuel supply to the engine is therefore assured even at low tank levels.

Pot 12 is preferably of molded plastic with opening 16, ramp 18 and boundary wall 20 all formed as an integral part in one molding process. This makes the swirl pot very inexpensive to manufacture.

Because the fuel return pipe 22 extends from above in a straight line into the pot, assembly of the tank connections is simple. As can be seen from FIGS. 6 and 7, the tank has an aperture 32 close to one wall 34. The pot 12 is positioned directly below this aperture and all connections into the pot can be simply lowered through this aperture.

In addition to pump 26 with its intake 28, a fuel gauge sender unit can be incorporated in one sub-assembly with the pump and the return pipe 22.

Figure 8:
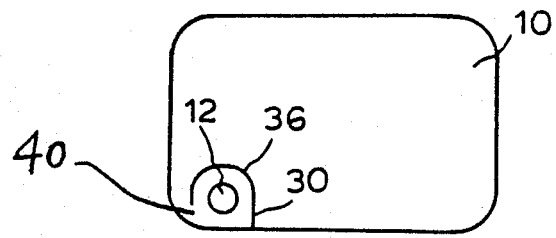
FIG. 8 is a schematic plan view of the entire tank.
Figure 7:
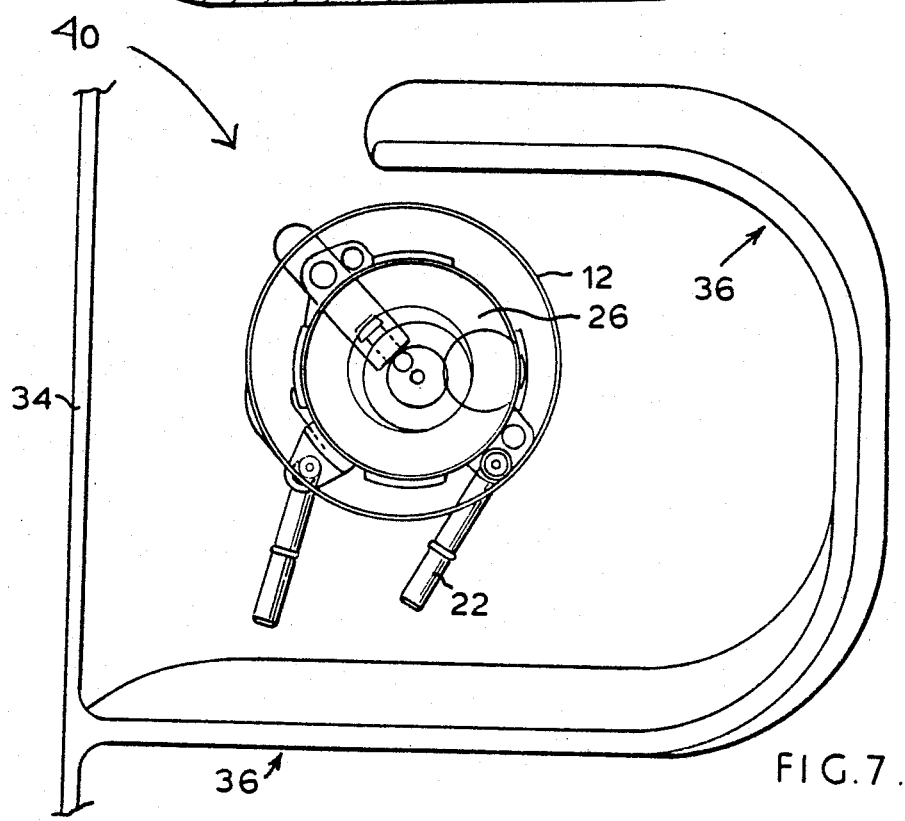
FIG. 7 is a plan view of the swirl pot in position in the tank.

The fuel tank shown in FIGS. 6, 7 and 8 is a molded plastic tank. Aperture 32, through which the swirl pot assembly is inserted into the tank, is close to one corner, as can be seen in FIG. 6, and weir 36 surrounds the position of the swirl pot 12 (FIG. 7).

The weir is preferably formed by ridges raised from the floor of the tank and extending from the tank wall around the pot and back towards the wall. A gap 40 is left between the wall and the weir to allow fuel to flow behind the weir when the fuel is able to distribute itself evenly across the tank. FIG. 8 shows that gap 40 is close to a corner of the tank. This arrangement ensures that fuel will remain behind the weir under most driving conditions so that fuel will be available around opening 16 of the pot and therefore available to be drawn into the pot.

Variations and modifications of the present invention are possible without departing from its spirit and scope as defined by the appended claims.

We claim:

1. A motor vehicle fuel tank comprising a main volume and a swirl pot having a base and outer wall and being positioned near the bottom of the tank and having an opening adjacent said base and means within the pot for directing a flow of liquid past said opening in such a direction so as to produce a suction through said opening.

2. The motor vehicle fuel tank according to claim 1 wherein said means for directing a flow of liquid comprises a ramp inside said pot.

3. The motor vehicle tank according to claim 2 wherein said ramp extends towards the base of said pot and ends just above said base, and wherein said opening in the wall of the pot lies between the end of said ramp and said base.

4. The motor vehicle fuel tank according to claim 3 wherein said ramp is bounded on one side by the outside wall of the pot and on the other side by an internal wall in the pot.

5. A motor vehicle fuel tank comprising a main volume, a swirl pot having a base and an outer wall and being placed at the bottom of the tank, a fuel pump intake arranged to draw fuel from within said pot, and a fuel return line arranged to deliver fuel to a means within said pot for directing liquid past an opening in said pot in such a direction as to produce a suction through said opening.

6. The motor vehicle fuel tank according to claim 5 further comprising a restriction within said fuel return line so that fuel is delivered into said pot as a jet.

7. The motor vehicle fuel tank according to claim 5 wherein said fuel return pipe extends in a generally straight line within said tank.

* * * * *